United States Patent [19]
Yokouchi et al.

[11] Patent Number: 5,473,462
[45] Date of Patent: Dec. 5, 1995

[54] OPTICAL SIGNAL DETECTION CIRCUIT

[75] Inventors: Jungo Yokouchi; Satoshi Takahashi; Yutaka Sadohara, all of Yokohama, Japan

[73] Assignee: Sumitomo Electric Industries, Ltd., Osaka, Japan

[21] Appl. No.: 315,498

[22] Filed: Sep. 30, 1994

[30] Foreign Application Priority Data

Sep. 30, 1993 [JP] Japan .................. 5-245480

[51] Int. Cl.$^6$ .................................. H04B 10/06
[52] U.S. Cl. ........................... 359/189; 359/194
[58] Field of Search .................. 359/189, 194, 359/195

[56] References Cited

FOREIGN PATENT DOCUMENTS

| 0076329 | 4/1987 | Japan | 359/189 |
|---|---|---|---|
| 0285534 | 12/1987 | Japan | 359/189 |
| 4196632 | 7/1992 | Japan | 359/189 |

*Primary Examiner*—Leslie Pascal
*Attorney, Agent, or Firm*—Cushman Darby & Cushman

[57] ABSTRACT

An optical signal detection circuit of the present invention comprises (a) a light receiving unit for converting received light into an electric signal, (b) a light-level detection circuit for receiving a photoelectrically converted signal from the light receiving unit, in accordance with a variation of intensity of the received light, detecting an incidence of the light and informing the incidence of the light when a predeterminded time has passed, and (c) an information extracting circuit for receiving the photoelectrically converted signal from the light receiving unit, receiving the information from the light-level detection circuit, and extracting information carried by the received light, and the light-level detection circuit comprises (1) a peak holding circuit for detecting the photoelectrically converted signal and outputting a signal in accordance with the peak-held and photoelectrically converted signal, (2) a reference potential setting circuit for setting a detection level of the photoelectrically converted signal, (3) a discrimination decision circuit for detecting that the photoelectrically converted signal exceeds the detection level, and (4) a capacitor element the first terminal of which is connected to a signal output node of the peak holding circuit and the second terminal of which is connected to a detection-level setting node of the reference potential setting circuit.

2 Claims, 6 Drawing Sheets

OPTICAL SIGNAL DETECTION CIRCUIT

BACKGROUND OF THE INVENTION

1. Field of the Invention

The present invention relates to an optical signal detection circuit for detecting light in a light receiving unit, and more particularly to an optical signal detection circuit having a function to detect whether amplitude of intensity of received light reaches a predetermined value.

2. Related Background Art

Conventionally, one of the circuits for detecting whether amplitude of intensity of light received reaches a predetermined value, which is hereinafter called light-level detection circuit, is a circuit shown in FIG. 1.

An optical signal received by a light receiving unit is photoelectrically converted into an electric signal, e.g., shown in FIG. 2. This electric signal is applied to the base (node E) of a transistor 1 constituting a light-level detection circuit. The transistor 1 is turned on by this electric signal input, and charges are accumulated in a capacitor 2. With the accumulation of charges, the emitter voltage (node F) of the transistor 1 increases in accordance with the signal input as shown in FIG. 3. The capacitor 2 holds the peak value of the light input signal. The charge accumulation period is adjusted by a current source 3. A transistor 4 is biased to a fixed value by a reference voltage generating circuit 5, and the emitter voltage (node G) of the transistor 4 is set to a fixed voltage shown in FIG. 3. The emitter voltages of the transistors 1 and 4 are applied to a discrimination decision circuit 6. When the emitter voltage of the transistor 1 exceeds the emitter voltage of the transistor 4, which means that the input optical signal exceeds the reference voltage, the discrimination decision circuit 6 changes its output voltage (node H) to high level as shown in FIG. 4. In accordance with the high level of the output signal of the discrimination decision circuit 6, it is decided that the optical signal with a certain level has been applied to the light receiving unit. Note that a capacitor 7 and a current source 8 are to make the reference potential generating circuit symmetrical to the signal input circuit constituted with the capacitor 2 and the current source 3 to improve the property against noise.

In the regulation of communication system such as FDDI (Fiber Distributed Data Interface), SDH (Synchronous Digital Hierarchy) etc., it is required that an output signal which indicates that the light level resulting from the operation of the light-level detection circuit is above the predetermined value, which means that the input optical signal is stable, is set after a predetermined period from the signal input. Then, it is known from the output of the light-level detection circuit that the input optical signal has been stabilized, and information carried by the input optical signal is extracted from the input optical signal. For example, in the light-level detection circuit schematically shown in FIG. 5, the photoelectrically converted input optical signal is divided to a signal circuit comprising buffers 22 and 23 and a light-level detection circuit comprising buffers 24 and 25 and a delay element 26, through a buffer 21. The timing $t_1$ of starting signal detection in the light-level detection circuit is delayed a predetermined delay time $T_D$ from the timing $t_0$ of actual signal input in the signal circuit as shown in FIG. 5, which prevents the inconvenience case that the signal circuit does not rise although the signal detection circuit has been turned on.

In the conventional light-level detection circuit shown in FIG. 1, time at which the discrimination detection circuit 6 outputs the detection signal is delayed a time T from time at which the signal is applied to the transistor 1 shown in FIG. 4.

SUMMARY OF THE INVENTION

It is an object of the present invention to provide an optical signal detection circuit capable of setting a time between a point of starting receiving an optical signal and a point of starting extracting information carried by the optical signal. And the optical signal detection circuit according to this invention can increase reliability of an extracted information from an inputting light.

To accomplish this object, an optical signal detection circuit of the present invention comprises (a) a light receiving unit for converting received light into an electric signal and outputting the signal, (b) a light-level detection circuit for receiving a photoelectrically converted signal from the light receiving unit, in accordance with a variation of intensity of the received light, detecting an incidence of the light and informing the incidence of the light when a setting time has passed, (c) a signal regeneration circuit for receiving the photoelectrically converted signal from the light receiving unit, and converting to a digital signal, (d) an information extracting circuit for receiving the digital signal from the signal regenerating circuit, receiving the information from the detection circuit, and extracting information carried by the received light. The light-level detection circuit comprises (1) a peak holding circuit for detecting the photoelectrically converted signal, and outputting a signal in accordance with the peak-held and photoelectrically converted signal, (2) a reference voltage setting circuit for setting a detection level of the photoelectrically converted signal, (3) a discrimination decision circuit for detecting that the photoelectrically converted signal exceeds the detection level, and (4) a capacitor element the first terminal of which is connected to a signal output node of the time averaging circuit and the second terminal of which is connected to a detection-level setting node of the reference voltage setting circuit.

Here, it is preferable that the light-level detection circuit further comprises a discharge circuit for adjusting a discharge rate of charges accumulated in the capacitor element.

In the above-described conventional circuit, it was difficult to adjust a delay time of the signal input detection timing. This was because the reference voltage which was an output of the reference potential generating circuit comprising the transistor 4 was held in a fixed value, which meant that the reference level to be compared with the input signal level was a fixed value. Therefore, to make signal input detection time T longer in order to reliably detect a signal after the optical signal was applied could not be achieved.

Note that the signal input detection time T can be adjusted by selecting capacitance of the capacitor 2 to change the response time of peak holding. However, if the capacitance of the capacitor 2 is changed, timing of detecting signal termination where no input signal is applied is also changed. Consequently, the signal input detection time T cannot be adjusted independently.

In the present invention, the voltage at an input optical signal detection node of a peak holding circuit varies in accordance with the optical signal input, and a variation of the voltage is transmitted to the detection-level setting node of the reference potential setting circuit through the capacitor, and the voltage at the detection-level setting node is shifted by a certain time from a value set by the reference potential setting circuit.

This time is arbitrary if discharge rate of charges accumulated in the capacitor is adjusted by a discharge circuit.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
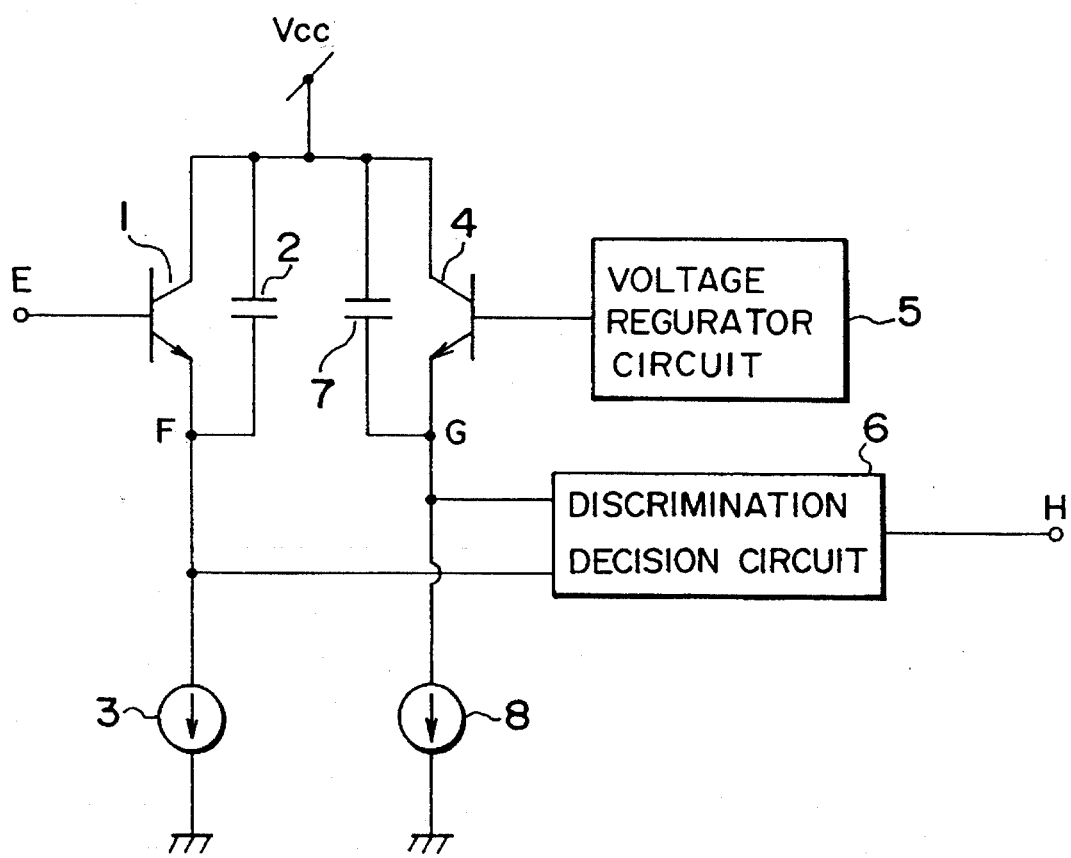
FIG. 1 is a circuit diagram showing a conventional light-level detection circuit.
Figure 2:
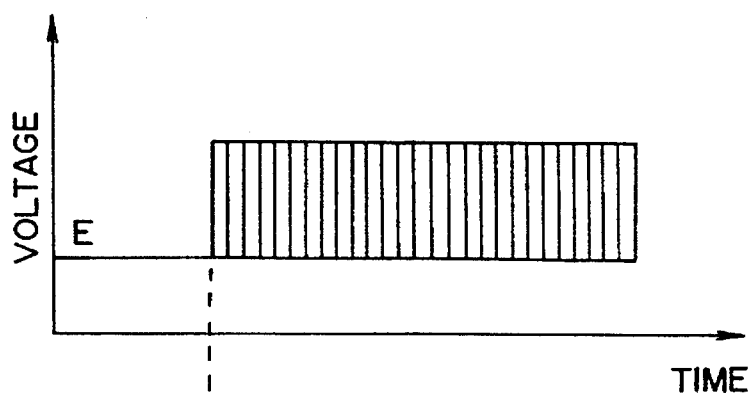
FIGS. 2–4 are views showing signal waveform of each part of a conventional light-level detection circuit.
Figure 3:
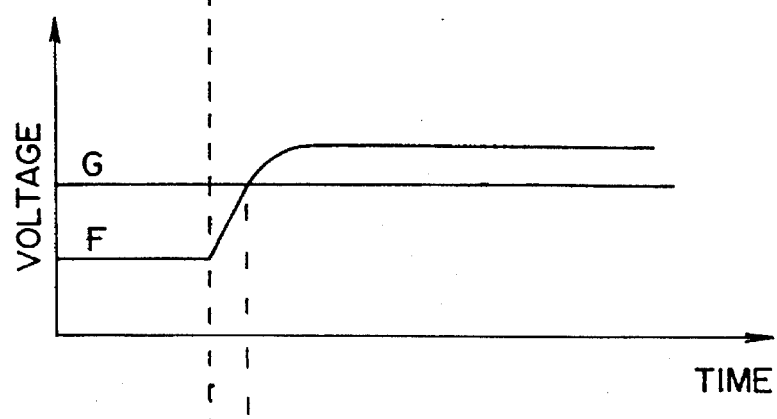
Figure 4:
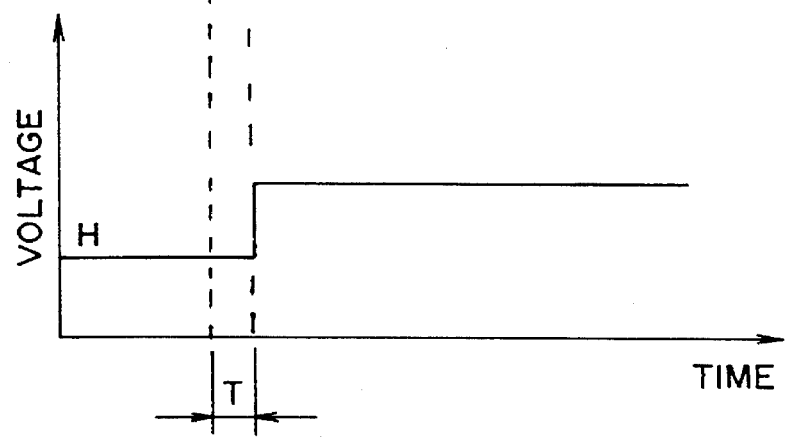
Figure 5:
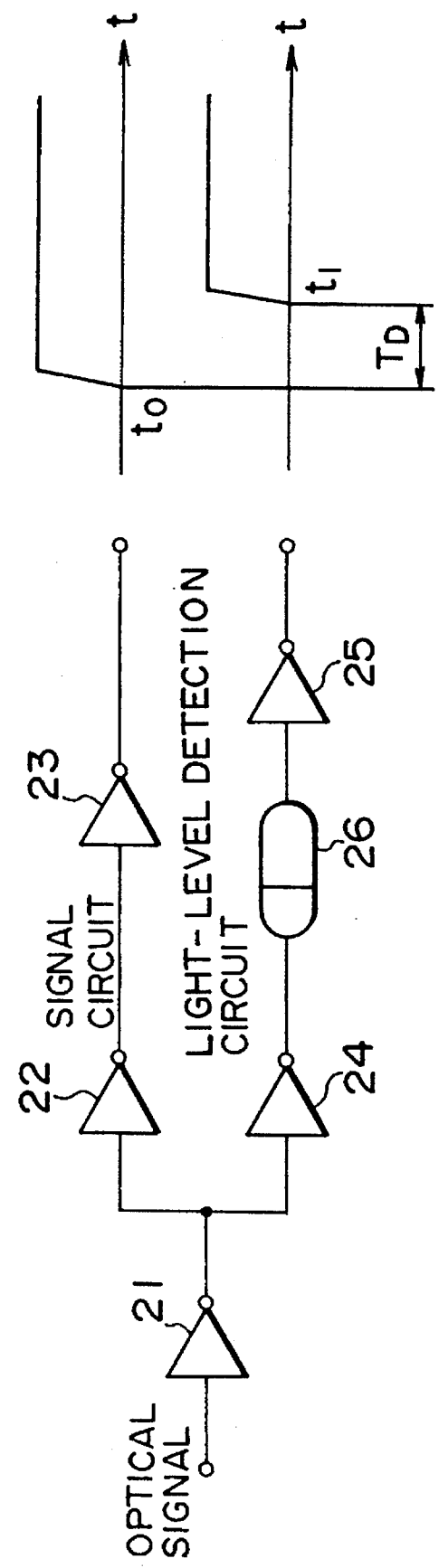
FIG. 5 is a view illustrating necessity of optical signal detection timing delayed from an actual signal input timing.
Figure 6:
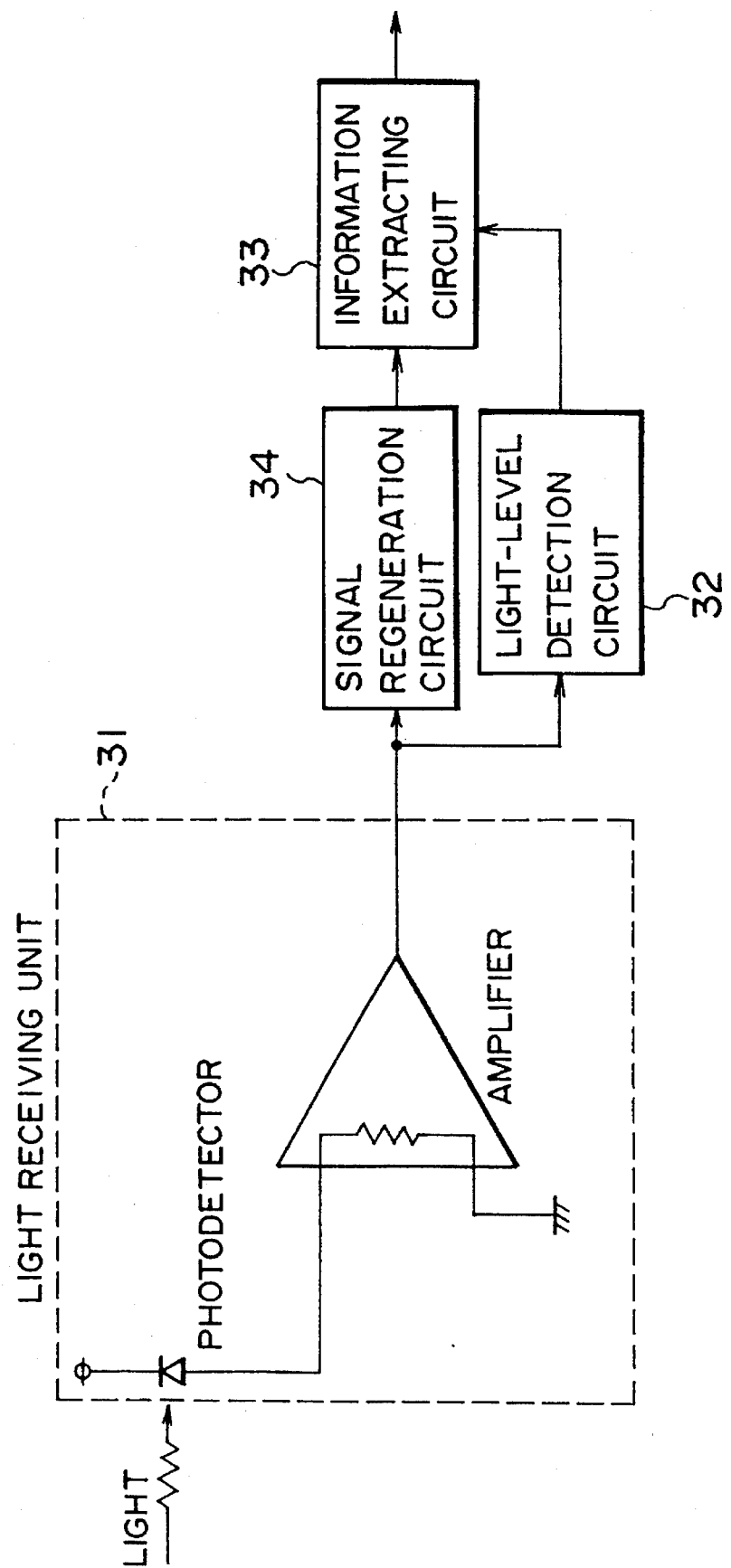
FIG. 6 is a block diagram of an optical signal detection circuit according to one embodiment of the present invention.

FIG. 6 shows an optical signal detection circuit according to one embodiment of the present invention. As shown in FIG. 6, a circuit of the present embodiment comprises (a) a light receiving unit 31 for converting received light into an electric signal and outputting the signal, (b) a light-level detection circuit 32 for receiving a photoelectrically converted signal from the light receiving unit, in accordance with a variation of intensity of the received light, detecting an incidence of the light and informing the incidence of the light when a setting time has passed, (c) a signal regeneration circuit 34 for receiving the photoelectrically converted signal from the light receiving unit, and converting to a digital signal, and (d) an information extracting circuit 33 for receiving the digital signal from the signal regenerating circuit, receiving the information from the detection circuit, and extracting information carried by the received light.

The optical signal entered to the light receiving unit 31 is photoelectrically converted in the light receiving unit 31. The photoelectrically converted signal is applied to the light-level detection circuit 32 and to the signal regeneration circuit 34. The light-level detection circuit 32 detects an incidence of the light, and outputs an information for the incidence of the light to the information extracting circuit 33 when an internally setting time has passed. The signal regenerating circuit 34 receive the signal from the light receiving unit 31, converts to a digital signal, and output the digital signal to the information extracting circuit 33. The information extracting circuit 33 recognizes from the information of the light-level detection circuit 32 that the optical signal input is stable, which means that the photoelectrically converted signal is stable, and extracts the information carried by the optical signal from the digital signal.

Figure 7:
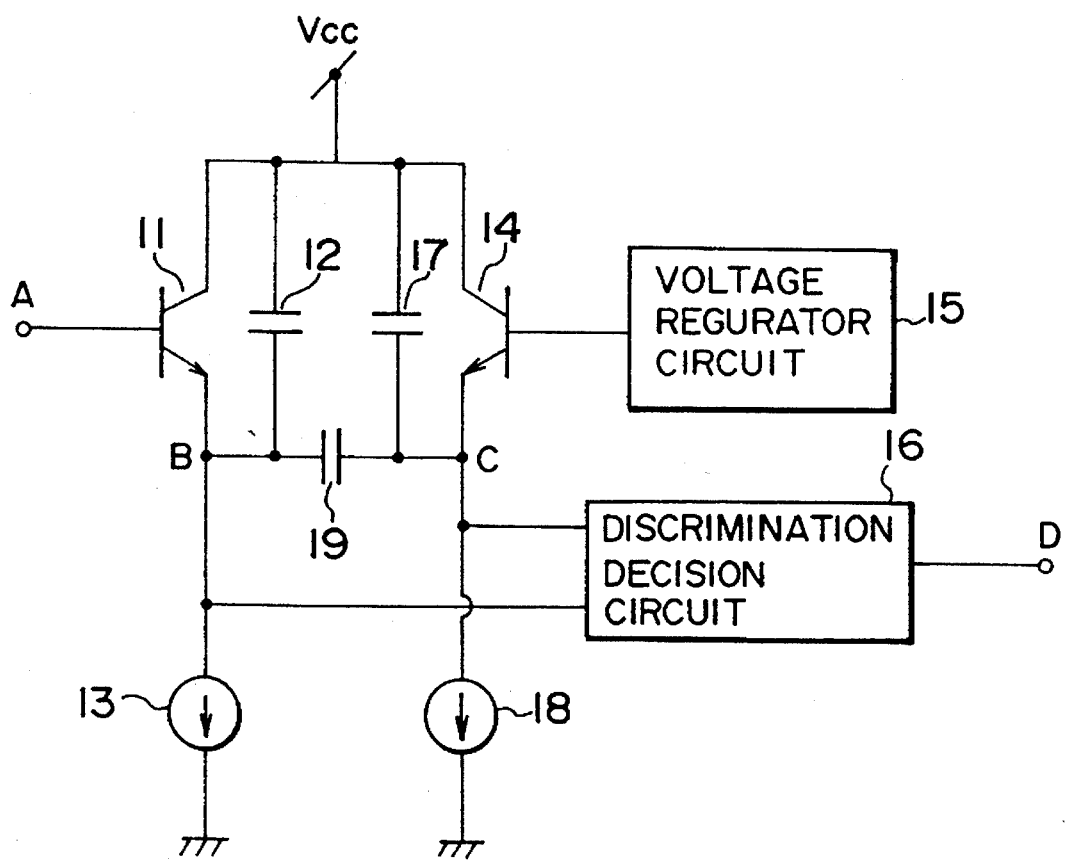
FIG. 7 is a circuit diagram showing a light-level detection circuit of one embodiment.

FIG. 7 is a view showing the structure of a light-level detection circuit which is a main part of the embodiment of the present invention.

The collector of an NPN transistor 11 is connected to a source voltage $V_{CC}$ and the emitter to a current source 13. A capacitor 12 is connected between the collector and emitter of the transistor 11 in parallel. The transistor 11, the capacitor 12 and the current source 13 constitute a peak holding circuit for detecting a photoelectrically converted input optical signal and holding its peak value. Further, the collector of an NPN transistor 14 is also connected to the source voltage $V_{CC}$ and the emitter to a current source 18. A capacitor 17 is connected between the collector and emitter of the transistor 14 in parallel, and a fixed reference voltage which is an output of a voltage regurator circuit 15 is applied to the base of the transistor 14. The transistor 14, the capacitor 17 and the current source 18 constitute a reference voltage setting circuit for setting a detection level of a photoelectrically converted input optical signal.

The emitter of the transistor 11 is an input optical signal detection node B of the peak holding circuit, and the emitter of the transistor 14 is a detection-level setting node C of the reference voltage setting circuit. A capacitor 19 is placed between the emitters of the transistors 11 and 14, and the voltage of the input optical signal detection node B is transmitted to the detection-level setting node C through the capacitor 19. A discharge rate of charges accumulated in the capacitor 19 is adjusted by the current source 18 which constitutes a discharge circuit for adjusting a discharge rate of the capacitor 19. The emitter voltages of the transistors 11 and 14 are applied to a discrimination decision circuit 16. When the input optical signal level detected at the node B exceeds the detection level set at the node C, the discrimination decision circuit 16 changes the voltage of an output terminal D to high level and detects the optical signal input.

Figure 8:
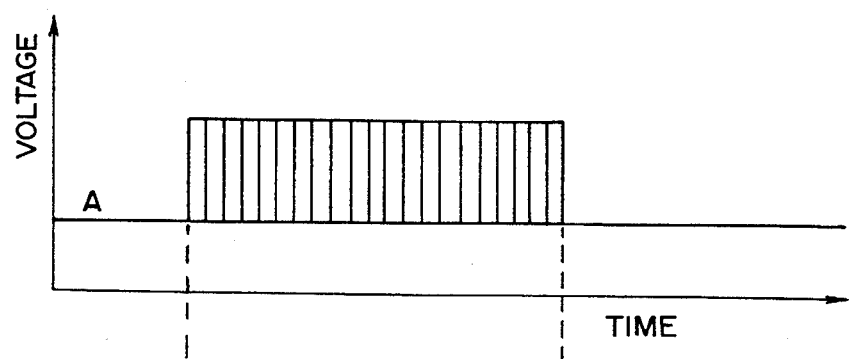
FIGS. 8–10 are views showing signal waveform of each part of a light-level detection circuit according to one embodiment.
Figure 9:
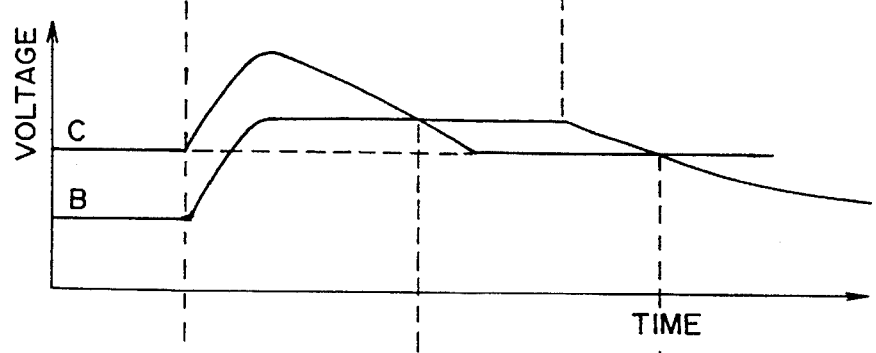

In such a circuit, the optical signal input to the light receiving unit is photoelectrically converted into an electric signal. The electric signal is amplified certain times by an amplifier, and converted into a signal having waveform, e.g., shown in FIG. 8. The photoelectrically converted input optical signal is applied to the base of the transistor 11 constituting the light-level detection circuit of the present embodiment. The transistor 11 is turned on by this signal input, and the capacitor 12 is charged by the voltage source $V_{CC}$ through the collector and emitter of the transistor 11. With this charge, the voltage of input optical signal detection node B increases as shown in FIG. 9. If the base voltage of the transistor 11 is lowered, the charging voltage of the capacitor 12 is not changed and the capacitor 12 holds the peak value of the input optical signal. The discharge rate of charges accumulated in the capacitor 12 is adjusted by the current source 13, and the discharge time is determined by the current flow of the current source 13.

Increase of voltage at the light-level detection node B is transmitted to the detection-level setting node C through the capacitor 19. The voltage at the detection-level setting node C is set to a predetermined value by a bias level of the transistor 14 generated by the reference voltage generating circuit 15 but because increase of the voltage at the light-level detection node B corresponding to the input optical signal is transmitted to the detection-level setting node C through the capacitor 19, the voltage at detection-level setting node C increases as shown in FIG. 9. In other words, the detection level to be compared with the input optical signal becomes high in accordance with the input optical signal.

Figure 10:
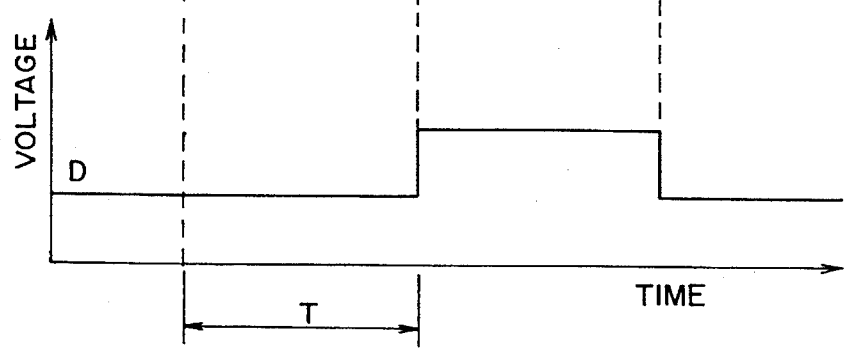

The voltage at the detection-level setting node C, to which the increase of the voltage is transmitted, gradually decreases as the charges accumulated in the capacitor 19 are discharged through the current source 18. Accordingly, as the current flow of the current source 18 is adjusted, the voltage drop at the detection-level setting node C can be adjusted. Therefore, time at which the voltage at the light-level detection node B exceeds the voltage at the detection-level setting node C can arbitrarily be set. The voltages at nodes B and C are applied to the discrimination decision circuit 16, and when the voltage at light-level detection node B exceeds the voltage at detection-level setting node C, the discrimination decision circuit 16 changes the voltage of the output terminal D to high level as shown in FIG. 10. Accordingly, the optical signal detection time T from the optical signal applied to the base of the transistor 11 to the output of the discrimination decision circuit 16 changed to high level can be set to an arbitrary time by selecting the amount of current flow of the current source 18. The amount of current flow of the current source 18 can be set when the circuit is designed. Alternatively, it can be set by making the current source 18 variable, and after the circuit is assembled, the volume of the current source is adjusted. Note that the voltage drop at detection-level setting node C can be adjusted by selecting the capacitance of the capacitor 19. However, if the capacitance of the capacitor 19 is changed, similar to the case of changing the capacitance of the capacitor 12, timing of the input-signal termination detection is also changed, which is not preferred.

As described above, according to the present invention, the voltage at input optical signal detection node of the peak holding circuit varies in accordance with the optical signal input, and this voltage variation is transmitted to the detection-level setting node of the reference potential setting circuit through the capacitor. Then, the voltage at the detection-level setting node is shifted by a certain time from a value set by the reference potential setting circuit. Therefore, duration of the input optical signal level reaching the detection level set by the reference potential setting circuit is made longer and the optical signal input detection time can be set longer than the conventional one.

Further, this optical signal input detection time is arbitrary if a discharge rate of charges accumulated in the capacitor is adjusted by a discharge circuit. Therefore, the optical signal input detection time can be set to an arbitrary time.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 245480/1993 filed on Sep. 30, 1993 is hereby incorporated by reference.

What is claimed is:

1. An optical signal detection circuit comprising:

a light receiving unit for converting received light into an electric signal and outputting the signal;

a light-level detection circuit for receiving a photoelectrically converted signal from said light receiving unit, in accordance with a variation of intensity of the received light, detecting an incidence of the light and informing the incidence of the light when a predeterminded time has passed; and an information extracting circuit for receiving the photoelectrically converted signal from said light receiving unit, receiving the information from said light-level detection circuit, and extracting information carried by the received light;

wherein said light-level detection circuit comprising:

a peak holding circuit for detecting said photoelectrically converted signal, and outputting a signal in accordance with the peak-held and photoelectrically converted signal;

a reference potential setting circuit for setting a detection level of said photoelectrically converted signal;

a discrimination decision circuit for detecting that said photoelectrically converted signal exceeds said detection level; and a capacitor element the first terminal of which is connected to a signal output node of said peak holding circuit and the second terminal of which is connected to a detection-level setting node of said reference potential setting circuit.

2. An optical signal detection circuit according to claim 1, wherein said light-level detection circuit further comprises a discharge circuit for adjusting a discharge rate of charges accumulated in said capacitor element.

\* \* \* \* \*